July 10, 1962 H. R. KILLIAN 3,043,160
VALVE OPERATOR
Filed Aug. 28, 1959 3 Sheets-Sheet 1

Inventor:
Henry R. Killian
By Hofgren, Brady, Wegner,
Allen & Stellman
Attorneys

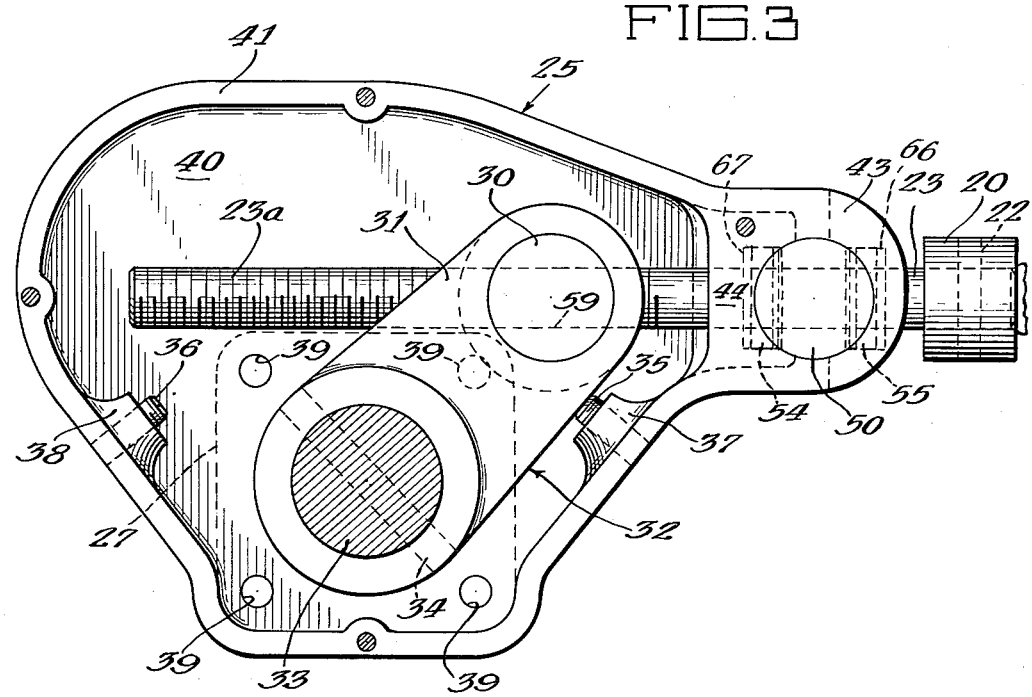
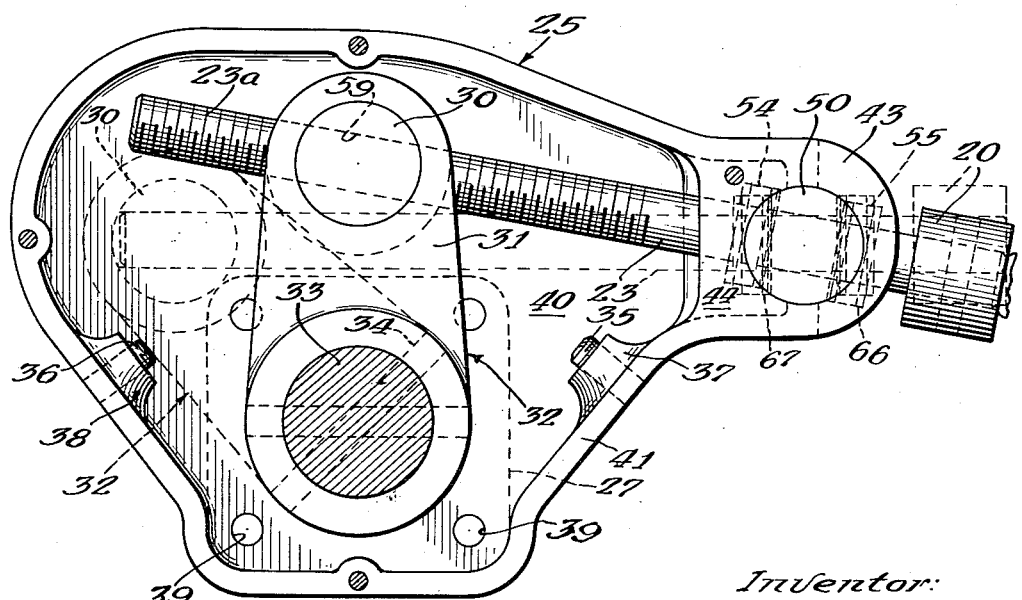

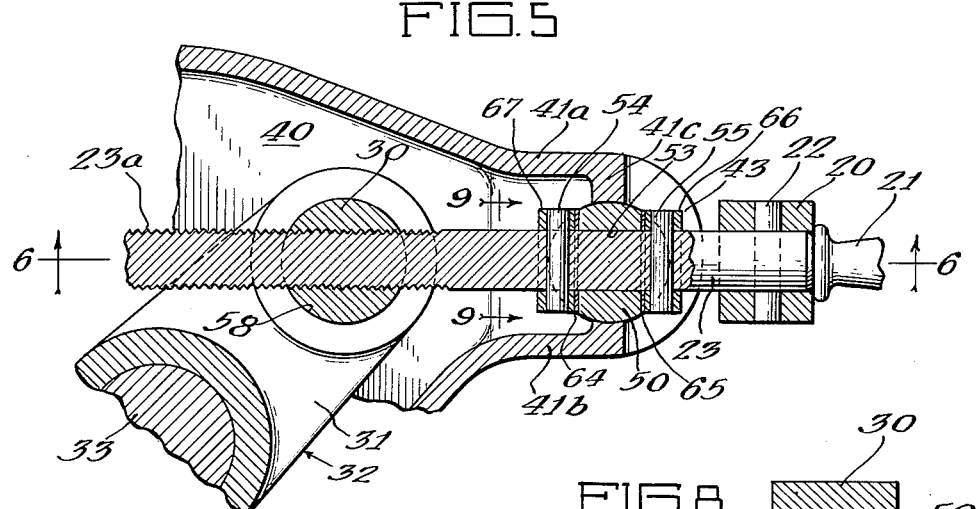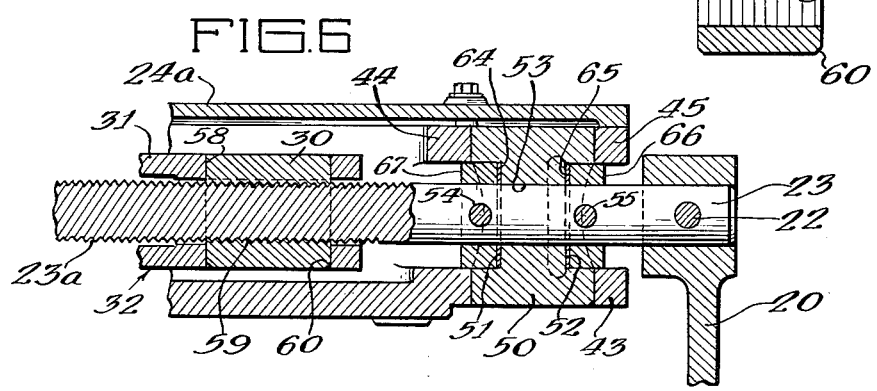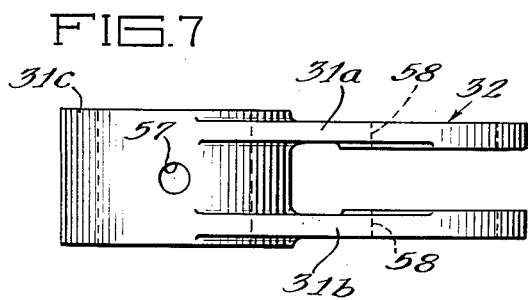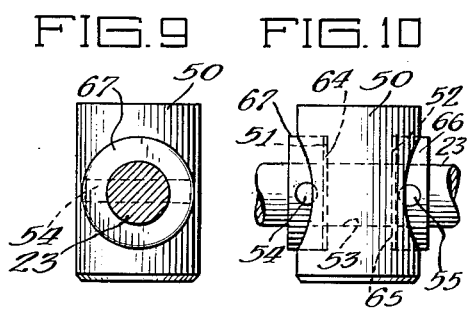

3,043,160
VALVE OPERATOR
Henry R. Killian, Park Forest, Ill., assignor to Henry Pratt Company, a corporation of Illinois
Filed Aug. 28, 1959, Ser. No. 836,803
7 Claims. (Cl. 74—509)

This invention relates to an operating mechanism for a valve and particularly to a valve operator for valves requiring about 90° of rotary movement between open and closed positions.

Various types of valves including cone, ball, rotary, butterfly and perhaps others have a shaft upon which the valve closure is mounted within a valve body and intended to turn with the shaft through approximately 90° between its fully open and fully closed positions. A crank may be attached to the valve shaft outside of the valve body and may be turned by hand or by various available motors in order to accomplish the 90° of movement or increments thereof. The present valve operator is intended to be secured to the valve housing to effect movement of the valve closure in the prescribed manner.

The primary object of this invention is to provide a new and improved valve operator of the character described.

Another object of the invention is to provide an operator having simplified parts and a single housing in which the parts may be interchangeably provided to furnish operators for different sizes of valves requiring different operative forces.

Another object is to provide an operator of simplified parts resulting in reduced cost of manufacture in addition to insuring operability over a longer life period.

A further object is to provide a valve operator structure adaptable readily for use with different power sources.

Other objects, features and advantages of the present invention will be apparent from the following description of a preferred embodiment illustrated in the accompanying drawings, in which:

FIGURE 3 is a broken plan view of the valve operator with the cover thereof removed to show the internal mechanism taken substantially along the line 3—3 in FIGURE 2 with the mechanism in the open valve position;

FIGURE 4 is similar to FIGURE 3 showing the mechanism in a different position;

FIGURE 5 is a fragmentary horizontal sectional view through the mechanism taken substantially along the line 5—5 in FIGURE 2;

FIGURE 6 is a vertical fragmentary sectional view through a portion of the valve operator taken substantially along the line 6—6 in FIGURE 5;

FIGURE 7 is a side elevational view of the crank removed from the mechanism;

FIGURE 8 is a vertical sectional view through the nut used with the crank and removed from the mechanism;

FIGURE 9 is a fragmentary sectional view looking toward the bearing block and taken substantially along the line 9—9 in FIGURE 5, and FIGURE 10 is a view of the bearing block shown in FIGURE 9 taken 90° thereto.

Figure 1:
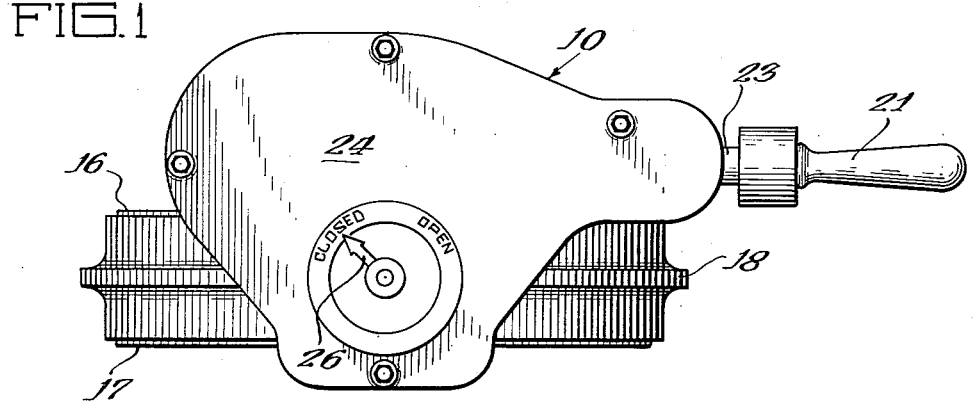
FIGURE 1 is a top plan view of the operator of this invention installed upon a butterfly wafer-type valve.
Figure 2:
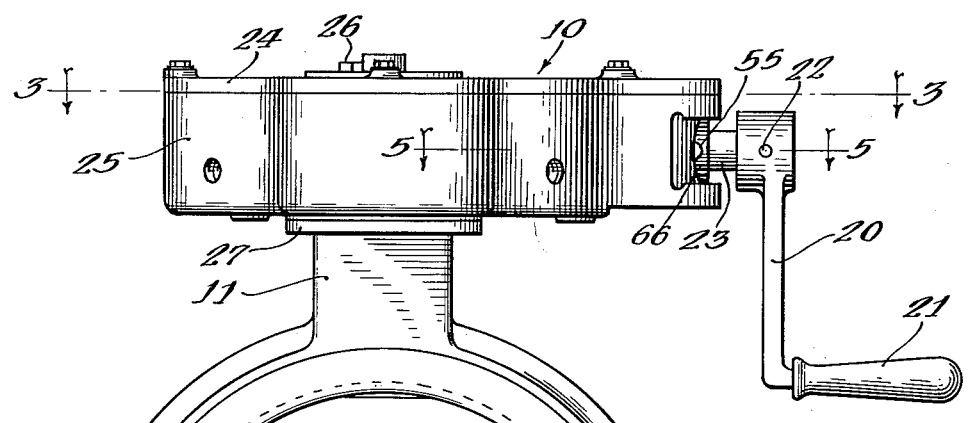
FIGURE 2 is an elevational view of the structure illustrated in FIGURE 1.
Figure 2:
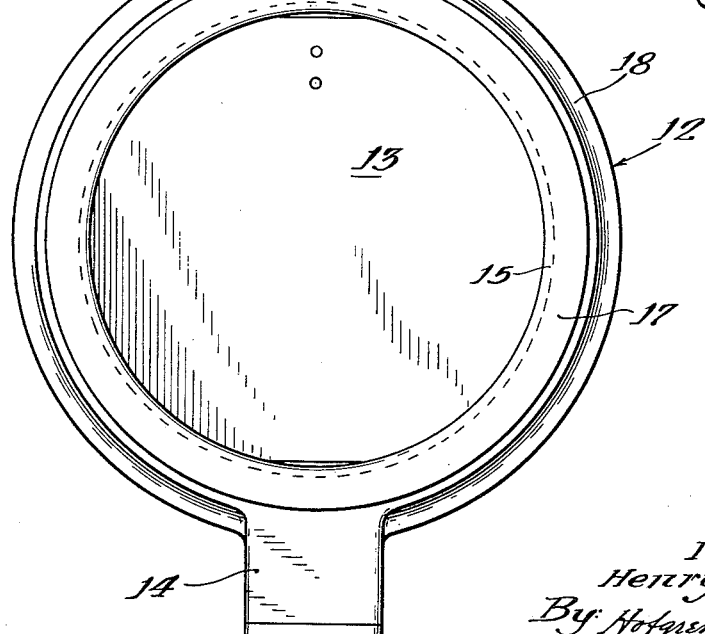

The valve operator of the present invention may be placed upon various types of valves as earlier mentioned, the illustrated valve being one of a wafer-type of butterfly valve. Referring particularly to FIGURES 1 and 2, the operator 10 may sit directly upon an upwardly extending bearing boss 11 formed as a part of the housing or body 12 of a butterfly valve. The valve has a disc 13 mounted upon a shaft passing through the body and rotatably supported in the bearing boss 11 and a similar lower boss 14. The valve has a rubber seat 15 including side flanges 16 and 17 integral therewith so as to seal the valve against flanges of pipe brought against the valve body. Such flange on the pipe may be bolted together against the valve, the bolts passing just outside of a central rib 18 upon the valve body.

A butterfly valve opens and closes by turning the valve disc 13 through approximately 90°. The valve in FIGURE 2 is shown in the closed position and the operator 10 is intended to turn the disc crosswise of the body 90° from the position illustrated. The particular operator is one intended to be hand operated by means of a crank 20 having a handle 21 and pinned by a pin 22 to an operator shaft 23. The mechanism is enclosed by a top cover plate 24 upon the cast housing 25 and the position of the valve is visually indicated by an arrow 26 carried by the cover for direct connection with the shaft of the valve. Suitable legend such as "closed" and "open" will indicate the extremes of movement of the valve and the position of the arrow between the extremes will indicate a partially open valve.

It is preferred in the present invention to mount the valve operator directly upon the valve. The housing 25 of the present operator is provided with a downwardly extending, relatively square boss 27 intended to be bolted directly to the valve and thus mount the operator to the valve. Ordinarily, a complete unit will include a valve and its operator. While the present operator is manually turned, air, water, or hydraulic cylinders may be used with the same basic operator unit. In some instances, geared electric motors are also used to operate valves and the present structure is adaptable to such use by connection thereof to the valve operator shaft 23.

The structure within the housing 25 is shown in FIGURES 3 and 4. The valve operator shaft 23 has an inner threaded portion 23a passing through a threaded nut 30 having a round configuration and positioned in the bifurcated arms 31 of a crank 32 intended to be pinned to the valve shaft 33 as by a pin 34. The crank may move between limits described by threaded studs 35 and 36 adjustably located in inwardly extending bosses 37 and 38 formed in the sidewalls of the housing.

Referring particularly to FIGURE 3, the means used for securing the entire operator to the valve includes drilled openings 39 in the four corners of the boss 27. With the cover removed, the openings 39 are accessible so that machine screws may be used to attach the operator to the valve itself.

Referring particularly to FIGURES 3 through 6, it may be seen that the operator 10 is composed primarily of a housing in two parts. The main casting comprises the housing 25 of one part and the other part is the cover 24. The main housing has a bottom wall 40 with an upstanding integral sidewall 41 which is continuous and extends about the periphery of the bottom wall 40. The main portion of the housing has a lateral extension shown best in FIGURES 5 and 6. The sidewall 41 has a pair of extensions 41a and 41b with a joining crosswall 41c extending primarily at right angles thereto. The bottom 40 of the housing is extended, forming an outwardly extending bottom wall portion 43 beyond the crosswall 41c. The housing also has an integral upper wall 44 which also extends beyond the joining wall 41c to form an outwardly extending part 45. The outwardly extending top and bottom walls 43 and 45 are generally coextensive. It is the extension of the body which houses the support for the operator shaft 23.

The particular means employed for mounting the valve operator shaft 23 in the housing employs a bearing block 50 of particular structure. The block is cylindrical in shape and mounted in a reamed opening formed in the extension of the housing to receive the block. The opening in the housing extension is formed to provide a bearing for the block in the top wall 44 and bottom wall 40 of the extension. Between these walls, the opening also bisects the joining wall 41c so that the block, in effect, is mounted in the wall of the housing. The block is of a size to substantially fill the opening in which it is placed and thus also acts to seal the opening in the housing wall made to receive it. In the figures of the drawing, it will be noted that the bearing block 50 is a cylindrical block having a round faced area 51 on one side and a similar area 52 on the opposite side and a cross bore 53 joining the faced areas. The shaft 23 of the operator passes through the bore 53 and thus from the outside to the inside of the housing. The faced areas provide accommodation for thrust bearing washers 64 and 65 against which thrust collars 66 and 67 are held in position on the shaft by cross pins 54 and 55 passaging crosswise through the shaft. The thrust bearing structure holds the shaft against longitudinal movement relative to the block 50. The bearing block has a relatively tight fit in the walls of the housing, and thus is retained in place allowing swinging of the shaft to accommodate turning of the crank and yet sealing the opening in the housing wall in which the block is mounted.

The motion of the crank is best illustrated in FIGURE 4 wherein the full line position of the crank 32 would indicate that the valve was about half open. The dotted line position against the stop 36 would show the valve in the closed position. The full line position shown in FIGURE 3 would be in the position holding the valve open. The form of the crank and nut which travels along the shaft 23 are shown in FIGURES 7 and 8. The crank has a pair of arms 31a and 31b forming a bifurcated member from the hub 31c. An opening 57 in the hub acccommodates the pin 34 for locking the crank to the valve shaft. Each of the arms has a bore 58 for receiving the round nut 30. The nut is provided with a thread 59 mating with the threaded valve shaft 23. The lower end of the nut is provided with a chamfer 60 to facilitate its insertion in the bore 58 in the arms of the crank As the crank moves, the round nut 30 may turn in the arms of the crank and the bearing block 50 in the housing extension may turn to allow swinging of the shaft, accommodating the arcuate movement of the crank. The addition of the cover 24 enclosed the entire operator so as to keep out dirt and foreign matter. While the present invention illustrated shows the cover extending over the the extension, without an opening therein, some motors may require access to the upper end of the bearing block 50 as well as the lower end. In such instances, an appropriate opening may be provided in the cover member.

The bearing block 50 is of sufficient size to allow the use of large and small shafts 23 by simply changing the size of the bore 53 through the block. Various changes in the size of the crank shaft and bearing block may be made as required for valves of different sizes. One size of the housing may thus accommodate a considerable range of sizes in valves by simply changing a few of the parts of the operator.

The foregoing detailed description has been given for clearness of understanding only and no unnecessary limitations are to be understood therefrom, for some modification will be obvious to those skilled in the art.

I claim:

1. A valve operator for a valve requiring about 90° of valve shaft turning motion, comprising: a hollow housing having a crank therein for receiving the valve shaft in a manner insuring turning of the valve shaft and crank together about the axis of the valve shaft, said housing having a laterally extended portion provided with integral upper and lower spaced wall portions and an integral joining wall portion extending between the spaced wall portions, said extended portion of the housing having a bore generally parallel to the valve shaft axis passing through the spaced wall portions and severing said joining wall portion to provide an opening in the housing communicating with the interior thereof; a bearing block mounted in said bore so as to fill the same, said block being swingably supported in the bore portions in said spaced wall portions and being in sealing engagement with said joining wall portion so as to completely close the opening in the housing, said bearing block having a central opening in alignment with said crank and a shaft passing through said central opening for operative connection to the crank, said shaft having means for transferring thrust to the bearing block, said bearing block permitting swinging movement of said shaft during arcuate movement of the crank within the housing.

2. A valve operator for a valve requiring about 90° of valve shaft turning motion, comprising: a hollow housing having a crank therein for receiving the valve shaft in a manner insuring turning of the valve shaft and crank together about the axis of the valve shaft, a bearing block mounted in said housing in spaced relation to said crank for rotary movement about an axis parallel to the axis of the valve shaft, said housing having integral wall portions providing support for said bearing block at each end and exposing a central portion of the block to the interior of the housing and a separate and opposite central portion of the block to the exterior of the housing, said wall portions being in bearing and sealing engagement with said bearing block, said block having an opening therethrough aligned with said crank and extending through said central portions; a shaft extending through said bearing block and connected with said crank for turning the same, said bearing block permitting swinging motion of said shaft relative to said housing during arcuate movement of said crank.

3. A valve operator as specified in claim 2 wherein said housing has a bottom wall and upstanding side walls with a top wall in the area of said bearing block, said bearing block being cylindrical in form and substantially filling a bore formed in said walls and said shaft substantially filling the opening in said bearing block so as to exclude matter from entering the housing.

4. A valve operator for a valve requiring about 90° of valve shaft turning motion, comprising: a hollow housing having a crank therein for receiving the valve shaft in a manner insuring turning of the valve shaft and crank together about the axis of the valve shaft, said housing having a bottom wall adapted to be secured to the valve to prevent turning of the housing with the crank; a bearing block mounted in the housing in spaced relation to the crank and having an axis generally parallel to the valve shaft axis, said block having opposite spaced portions exposed respectively to the interior and exterior of the housing and having a bore therethrough connecting said portions; a crank operating shaft extending through the bore in said bearing and having its inner end operatively connected with the crank, means transferring the force of said shaft in moving said crank to said bearing block and thus to said housing, said bearing permitting swinging movement of said shaft during arcuate movement of the crank in the housing and being in sealing engagement with the walls of the housing to seal the interior of the housing from the exterior.

5. A valve operator as specified in claim 4 wherein said bearing block has a flat area on each side about the bore therethrough and said shaft is provided with a pair of thrust bearing members one for engaging each flat area so as to transfer said thrust longitudinally of the shaft to said bearing block.

6. A valve operator for a valve having a shaft requiring about 90° of turning movement, comprising: a cast housing body having a bottom wall and continuous side wall forming a hollow portion, an upper wall joining and bridging across adjacent portions of said side wall to one side of said hollow portion, said upper wall being integral with said housing and generally parallel to said bottom wall, said housing having a bore extending through said upper and lower walls and bisecting said side wall to provide an opening through the side wall into said housing; a bearing block shaped to substantially fill said bore mounted therein and having a cross-bore therein extending from the exterior to the interior of the housing; a shaft extending through said cross bore and having means abutting said bearing block to prevent endwise movement of the shaft relative to the bearing block, said shaft having a threaded length inside the housing; a crank in the housing for attachment to the valve shaft to be turned and having means threadedly receiving said shaft; means for turning the shaft in said bearing block to move the crank, said bearing block permitting swinging movement of the shaft during crank movement and being in sealing engagement wtih the walls of the housing to seal the interior of the housing from the exterior; and a cover over the hollow portion of said housing.

7. A valve operator as specified in claim 6 wherein the portion of said housing receiving said bearing block is generally U-shaped in plan extension of the housing with the bearing block in the base of the U and said upper and lower walls extending outwardly beyond the side wall at the base of the U, said block being supported in the upper and lower walls on either side of said shaft and said side wall contacting the bearing block so that the block and adjacent walls substantially close the opening in the housing.

References Cited in the file of this patent

UNITED STATES PATENTS

| | | |
|---|---|---|
| 1,346,149 | Whitten | July 13, 1920 |
| 1,594,109 | Rodanet | July 27, 1926 |
| 1,770,265 | Flowers | July 8, 1930 |
| 2,548,994 | Miller et al. | Apr. 17, 1951 |
| 2,908,182 | Bacchi | Oct. 13, 1959 |
| 2,909,079 | Fawkes | Oct. 20, 1959 |

FOREIGN PATENTS

| | | |
|---|---|---|
| 258,275 | Italy | Apr. 12, 1928 |
| 739,346 | Great Britain | Oct. 26, 1955 |